United States Patent
Kaneko et al.

(10) Patent No.: US 9,561,732 B2
(45) Date of Patent: Feb. 7, 2017

(54) INFORMATION ISSUANCE APPARATUS, INFORMATION ISSUANCE METHOD AND PROGRAM

(71) Applicant: KABUSHIKI KAISHA TOSHIBA, Minato-ku, Tokyo (JP)

(72) Inventors: Yu Kaneko, Yokohama (JP); Shigeo Matsuzawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 391 days.

(21) Appl. No.: 14/198,869

(22) Filed: Mar. 6, 2014

(65) Prior Publication Data

US 2014/0336832 A1 Nov. 13, 2014

(30) Foreign Application Priority Data

May 7, 2013 (JP) .................................. 2013-097937

(51) Int. Cl.
*B60L 11/18* (2006.01)
*G06Q 50/06* (2012.01)
*G06Q 10/04* (2012.01)

(52) U.S. Cl.
CPC .......... *B60L 11/1844* (2013.01); *B60L 11/184* (2013.01); *B60L 11/1816* (2013.01); *B60L 11/1846* (2013.01); *B60L 11/1848* (2013.01); *G06Q 10/04* (2013.01); *G06Q 50/06* (2013.01); *B60L 2240/70* (2013.01);
(Continued)

(58) Field of Classification Search
None
See application file for complete search history.

(56) References Cited

U.S. PATENT DOCUMENTS

| 7,188,264 B2 | 3/2007 | Morisawa |
| 8,232,763 B1 | 7/2012 | Boot |

(Continued)

FOREIGN PATENT DOCUMENTS

| EP | 2 500 210 | 9/2012 |
| JP | 2004-180404 | 6/2004 |

(Continued)

OTHER PUBLICATIONS

Office Action mailed Jan. 22, 2016 in counterpart European Patent Application No. 14157439.2.

(Continued)

*Primary Examiner* — Qing Wu
(74) *Attorney, Agent, or Firm* — Nixon & Vanderhye P.C.

(57) ABSTRACT

According to one embodiment, there is provided an information issuance system including: a segmentation unit, an information generating unit and a transmitting unit. The segmentation unit segments a plurality of travelling apparatuses existing within a demand-and-supply adjustment district and travelling by use of electric power into first to N-th groups on the basis of a number of the travelling apparatuses. The information generating unit sets first to N-th target periods different from each other with respect to the first to N-th groups and to generate first to N-th requests for requesting the travelling apparatuses to restrain electric charges from being performed during the first to N-th target periods. The transmitting unit respectively transmits the first to N-th requests to the travelling apparatuses belonging to the first to N-th groups before starts of the first to N-th target periods.

12 Claims, 7 Drawing Sheets

(52) U.S. Cl.
CPC ......... *B60L 2240/80* (2013.01); *Y02E 60/721* (2013.01); *Y02P 80/11* (2015.11); *Y02P 80/14* (2015.11); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | |
|---|---|---|
| 2004/0103329 A1 | 5/2004 | Morisawa |
| 2011/0258018 A1 | 10/2011 | Tyagi et al. |
| 2012/0239594 A1 | 9/2012 | Boot |
| 2012/0245750 A1 | 9/2012 | Paul et al. |
| 2016/0001656 A1* | 1/2016 | Korenaga ......... H01M 10/4207 701/22 |

FOREIGN PATENT DOCUMENTS

| | | |
|---|---|---|
| JP | 2011-229374 | 11/2011 |
| JP | 2012-048286 | 3/2012 |
| JP | 2012-194977 | 10/2012 |
| WO | 2012/146907 | 11/2012 |

OTHER PUBLICATIONS

Extended European Search Report mailed Sep. 18, 2014 in counterpart European Patent Application No. 14157439.2-1804.

Zhang, Peng et al., "Demand Response for Optimisation of Power Systems Demand Due to EV Charging Load," Power and Energy Engineering Conference (APPEEC), 2012 Asia-Pacific, IEEE, Mar. 27, 2012, pp. 1-4.

English-language machine translation of JP 2012-048286.

* cited by examiner

INFORMATION ISSUANCE APPARATUS, INFORMATION ISSUANCE METHOD AND PROGRAM

CROSS-REFERENCE TO RELATED APPLICATIONS

This application is based upon and claims the benefit of priority from Japanese Patent Application No. 2013-097937, filed May 7, 2013; the entire contents of which are incorporated herein by reference.

FIELD

Embodiments described herein relate to an information issuance apparatus, an information issuance method and a program.

BACKGROUND

An electric power supplier operates electric power so that a quantity of electricity demand does not exceed a quantity of the electric power supply in every district for adjustment of demand and supply. The term "the district for the adjustment of demand and supply" connotes a physical area that is statically determined from a power transmission and distribution network.

On the other hand, there exists a technique called a demand response (DR). According to the DR, a power supplier requests a demander of the electric power (a consumer of the electric power) to reduce a power consumption and to change a period of time of the consumption. The power supplier, if it is predicted that a demand quantity of the electric power exceeds a supply quantity of the electric power in a certain demand-and-supply adjustment district, implements the DR with respect to this demand-and-supply adjustment district and adjusts the demand for the electric power. Herein, the power supplier is exemplified by a power company and a power producer and supplier (PPS). Further, the consumer of the electric power is exemplified by a driver of an electric vehicle (EV). The EV may be, without being limited to an automobile driven by only the electricity, e.g., a hybrid car of such a type that the car is mounted with a gasoline engine and an electric motor and is thereby driven, and includes a so-called plug-in hybrid car in which the EV can be charged with the electricity directly from a socket.

A DR-based request is notified to a system of the EV driver from the system of the power supplier by use of IT technologies. The system of the EV driver is exemplified by car navigation software installed in the EV and a mobile terminal such as a smartphone carried by the EV driver.

In the case of implementing the DR for a certain demand-and-supply adjustment district, it frequently happens that the power consumption in the demand-and-supply adjustment district abruptly rises immediately after a DR target period terminates. This is because the EV is disabled from being used if not charged with the electricity, and the EV driver has a strong tendency to charge the EV with the electricity promptly when reaching a chargeable period of time. Moreover, this phenomenon is influenced by a quick charging technology. Further, the EVs are to move, and hence such a possibility exists that a good number of EVs concentrate at the demand-and-supply adjustment district.

The power supplier desires to avoid the abrupt rise of the power consumption. This is because when the power consumption abruptly rises, the demand and the supply are hard to be adjusted. However, a known DR issuance system does not assume the EVs as DR targets. Accordingly, in the case of implementing the DR with respect to the EV, as described above, there is the tendency that the power consumption abruptly increases immediately after the DR implementation target period terminates.

As described above, the prior arts do not assume the EVs as the DR targets, and therefore such a problem exists that the power consumption abruptly increases immediately after the DR implementation target period terminates.

DETAILED DESCRIPTION

According to one embodiment, there is provided an information issuance system including: a segmentation unit, an information generating unit and a transmitting unit.

The segmentation unit segments a plurality of travelling apparatuses existing within a demand-and-supply adjustment district and travelling by use of electric power into first to N-th groups on the basis of a number of the travelling apparatuses.

The information generating unit sets first to N-th target periods different from each other with respect to the first to N-th groups and to generate first to N-th requests for requesting the travelling apparatuses to restrain electric charges from being performed during the first to N-th target periods.

The transmitting unit respectively transmits the first to N-th requests to the travelling apparatuses belonging to the first to N-th groups before starts of the first to N-th target periods.

Hereinafter, embodiments of the present invention will hereinafter be described.

First Embodiment

Figure 1:
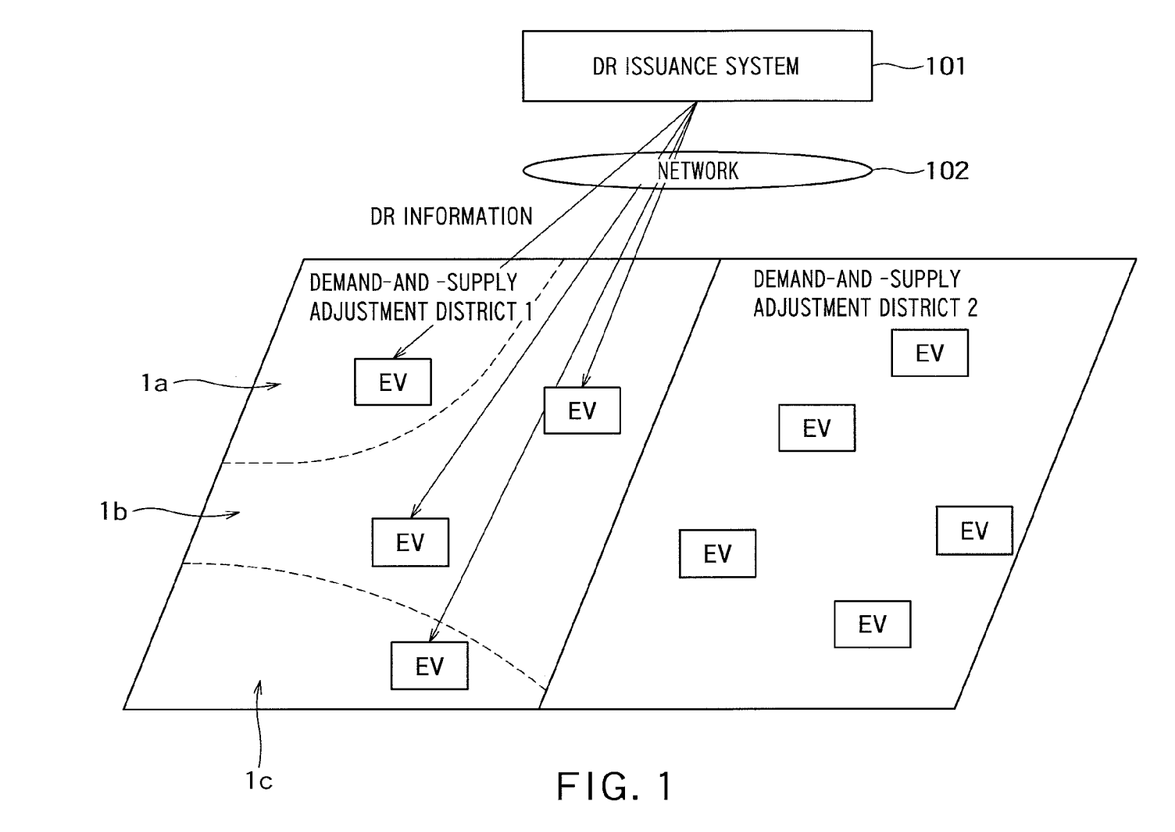
FIG. 1 shows a DR implementation environment assumed in a first embodiment.

FIG. 1 illustrates a DR (Demand Response) implementation environment assumed in a first embodiment.

There exist a DR issuance system 101 defined as an electric power supplier system and EVs. The DR issuance system 101 implements the DR for EVs, buildings and houses existing in demand-and-supply adjustment districts. The first embodiment assumes particularly the EVs as DR implementation targets. However, the EV is one example. The DR implementation targets, if being travelling apparatuses that travel by use of electric power of chargeable/dischargeable electricity storages, may include apparatuses other than the EVs.

Communications between the DR issuance system 101 and the EVs are performed via a network 102. An arbitrary network type may be adopted. A general communication method utilizes a wireless communication line of the same telecommunications carrier as the telecommunications carrier to which a mobile phone or a smartphone belongs. However, the communication method is not limited to this method. Further, each demand-and-supply adjustment district is statically determined from the power transmission and distribution network. FIG. 1 depicts demand-and-supply adjustment districts 1 and 2. FIG. 1 illustrates how the DR is implemented for the demand-and-supply adjustment district 1. Districts 1a, 1b, 1c are districts into which the demand-and-supply adjustment district 1 is segmented, and an in-depth description thereof will be given later on.

Figure 2:
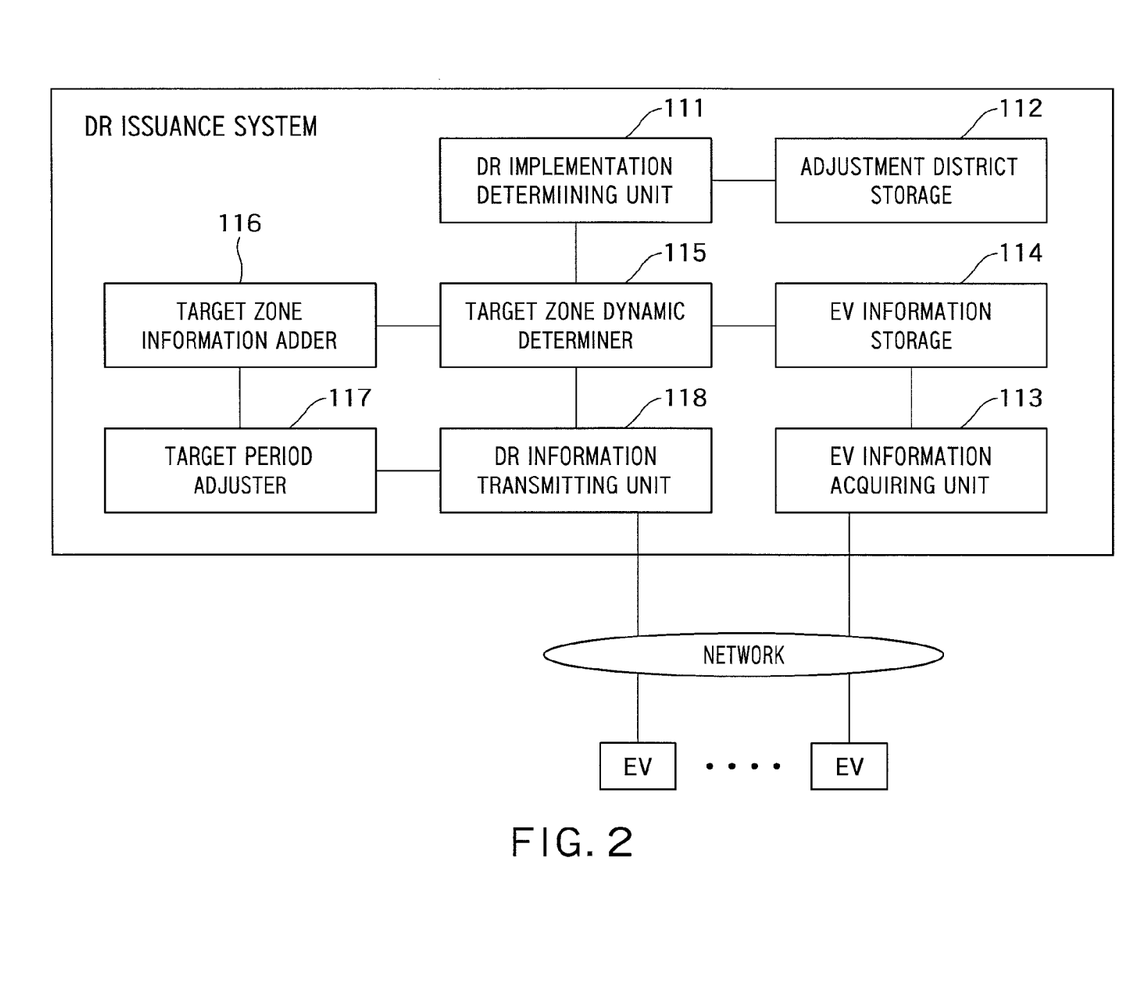
FIG. 2 illustrates a configuration of a DR issuance system according to the first embodiment.

FIG. 2 illustrates a configuration of the DR issuance system.

A DR implementation determining unit 111 determines the demand-and-supply adjustment district as the DR implementation target, a DR implementation period, a unit price of electric power, an incentive fee and a power consumption facility type (EV, house, building, factory, etc.), and creates DR information. Typically, the DR implementation determining unit 111 predicts a demand quantity and a supply quantity in a certain demand-and-supply adjustment district, and sets a period of time in which the demand exceeds the supply as a DR implementation target period. A method of determining the DR implementation includes a variety of methods such as a method of determining the DR implementation from predicted values of the demand and the supply of the electric power and a method of determining the DR implementation from prediction of weather such as a temperature, a humidity and solar radiation. The DR information includes mainly the following items of information.

Message ID . . . ID for identifying the DR information.

Demand-and-Supply Adjustment district ID . . . ID for identifying the demand-and-supply adjustment district in which the DR is implemented.

DR Implementation target period . . . Period for which the DR is implemented.

Unit Price of Electric Power . . . Unit price of electric power. This item of information is required in the case of a tariff-basis DR.

Incentive fee . . . Amount of money equivalent to an incentive. This item of information is required in the case of an incentive-basis DR.

A DR implementation request method is classified into the tariff-basis DR and the incentive-basis DR.

The tariff-basis DR is defined as a method of giving notification of the unit price of the electric power. The power supplier sets high the unit price of the electric power in the period of time in which the power consumption is to be reduced. Then, the unit price of the electric power is notified to an EV driver. The power supplier expects that the EV driver charges the EV with the electricity in a way that avoids the period of time exhibiting the high unit price of the electric power. In the case of the tariff-basis DR, the DR information contains the unit price of the electric power. During the DR implementation target period, if the EV driver charges the EV with the electricity, an electricity cost is charged based on the unit price of the electric power specified in the DR information.

The incentive-basis DR is defined as a method of giving notification of the incentive. The term "incentive" connotes a value (reward) paid for stopping the charge. The power supplier issues the incentive to the period of time in which the power consumption is to be reduced. Then, incentive information is notified to the EV driver. The power supplier expects that the EV driver stops charging the EV with the electricity in order to acquire the incentive. In the case of the incentive-basis DR, the DR information contains the incentive fee. The incentive is defined as, e.g., an amount of money such as "100 yen". The EV driver acquires the incentive if not charging during the DR implementation target period. If the DR implementation target is the EV, the DR information becomes a request for requesting a restraint on charging the EV with the electricity. The DR is no more than the "request". The DR does not forcibly stop charging the EV with the electricity.

A adjustment district storage 112 gets stored with items of information on the demand-and-supply adjustment districts. The following items are stored on a per demand-and-supply adjustment district basis.

Demand-and-Supply Adjustment district ID

Name . . . Name of Demand-and-Supply Adjustment district

Domicile . . . Domiciles of Demand-and-Supply Adjustment districts

Coordinates . . . Coordinates Indicating Demand-and-Supply Adjustment districts

An EV information acquiring unit 113 acquires the EV information via the network. The EV information is exemplified by items of information indicating a past result of the charge (the information indicating when, where and how much the EV is charged with the electricity), a present position of the EV, information indicating whether the EV travels underway or stops underway, information indicating whether charged with the electricity underway or not, and information indicating a residual quantity of the charge. The information indicating the present position may be detailed information such as latitudes and longitudes and may also be slightly fuzzy information such as domiciles. There are a diversity of EV information expression methods and EV information transmission methods as in the case of DR information expression methods and DR information transmission methods, which will be described later on. One example of the EV information is given as follows.

ID for Uniquely Identifying the EV

Information for Performing Communications with EV (IP Address, Port Number, etc.)

Present Position

Status (Traveling Underway, Stopping Underway, Charging Underway)

Residual Quantity of Charge

Chargeable Quantity (Value Indicating How Much Chargeable)

Count of Cooperation for DR

Information Update Time

An EV information storage 114 gets stored with the EV information of each EV, which is acquired by the EV information acquiring unit 113.

A Target zone dynamic determiner 115 includes a segmentation unit that segments the EVs into a plurality of groups, which exists in the demand-and-supply adjustment district in the case of implementing the DR with respect to the EVs in a certain demand-and-supply adjustment district. The segmentation unit segments the EVs so as not to cause any problems about regulating the demand and the supply even when the EVs existing within a certain district start being charged with the electricity simultaneously after being segmented by making use of the EV information in the EV information storage 114. If no problem arises in terms of regulating the demand and the supply even when not segmented, the segmentation is not carried out. In the first embodiment, an assumption is that the demand-and-supply adjustment district is segmented into a plurality of zones, and one group is configured by the EVs belonging to the same zone with respect to the individual zones after being segmented. Each of the zones after being segmented is called a DR implementation target zone. Thus, the target zone dynamic determiner 115 dynamically determines, on the occasion of implementing the DR, the plurality of DR implementation target zones in the DR implementation target demand-and-supply adjustment district. However, the segmentation of the district is nothing but one example of grouping, and the EVs may be segmented into a plurality of groups without segmenting the district. For example, the EVs, which are geographically distanced from each other within the same demand-and-supply adjustment district, may belong to the same group.

The following are several examples of the methods of segmenting the demand-and-supply adjustment district (a grouping method of the EV groups). The Target zone dynamic determiner 115 segments the demand-and-supply adjustment district by use of any one or plurality of segmentation methods given as below.

[1] The demand-and-supply adjustment district is segmented so that the number of the EVs belonging to each of the zones after being segmented is equal to or smaller than a threshold value and is equalized as well. Note that the demand-and-supply adjustment district may be segmented in a way that matches with demarcated areas of actual domiciles. However, this type of segmentation is not necessarily required to be done.

[2] The demand-and-supply adjustment district is segmented so that the number of the EVs being charged with the electricity underway is equal to or smaller than a threshold value and is equalized as well in each of the zones after being segmented.

[3] The demand-and-supply adjustment district is segmented so that a total value of the residual quantities of the charges of the EVs is equal to or smaller than a threshold value and is equalized as well in each of the zones after being segmented. For example, supposing that there exist an EV 1 exhibiting "10" as the residual quantity of the charge and an EV 2, an EV 3 each exhibiting "5" as the residual quantity of the charge in the demand-and-supply adjustment district, the demand-and-supply adjustment district is segmented into a zone covering the EV 1 and a zone covering the EV 2 and EV3. Namely, the EVs are segmented into a group of the EV 1 and a group of the EV2 and the EV 3.

[4] The demand-and-supply adjustment district is segmented so that a total value of the chargeable quantities of the EVs is equal to or smaller than a threshold value and is equalized as well in each of the zones after being segmented. For instance, supposing that there exist the EV 1 exhibiting "5" as the chargeable quantity and the EV 2, the EV 3 each exhibiting "3" as the chargeable quantity, the EVs are segmented into the zone covering the EV 1 and the zone covering the EV 2 and EV3.

[5] Taking into consideration that the EVs are to move, any one of the segmentation processes [1]-[4] is executed in a manner that excludes the EVs positioned in the vicinity of a border of the demand-and-supply adjustment district.

[6] Taking into consideration that the EVs are to move, the positions of the EVs during the DR implementation period are predicted, and any one of the segmentation processes [1]-[4] is executed based on these predicted positions. There are a variety of methods of predicting the positions of the EVs. For example, such a method exists that a directional vector (bearing and velocity) of the EV is calculated from past changes in positions of the EV, and the position during the DR implementation period is then predicted.

Moreover, the target zone dynamic determiner 115 copies the DR information generated by the DR implementation determining unit 111 by the number of the segmented DR implementation target zones. The copies of the DR information are allocated to the respective DR implementation zones.

A target zone information adder 116 adds the information on the DR implementation target zones associated therewith to the DR information, respectively. There exist several methods of expressing the information on the target zones, and examples are given as follows.

Array of Coordinates Representing Polygons

Domicile, Address

A target period adjuster 117 adjusts a value of the "target period" in the multiple items of the DR information on the respective DR implementation zones. To be specific, target period termination time is differentiated for every DR implementation target zone by shifting the target period of the DR information forward and backward. This contrivance enables the EVs within the demand-and-supply adjustment district to avoid starting the charges simultaneously when the DR implementation target period for a certain demand-and-supply adjustment district terminates.

The DR information copy function of the target zone dynamic determiner 115, the function of the target zone information adder 116 and the function of the target period adjuster 117 correspond to an information generating unit configured to generate DR information of each DR implementation target zone (each group).

Figure 3:
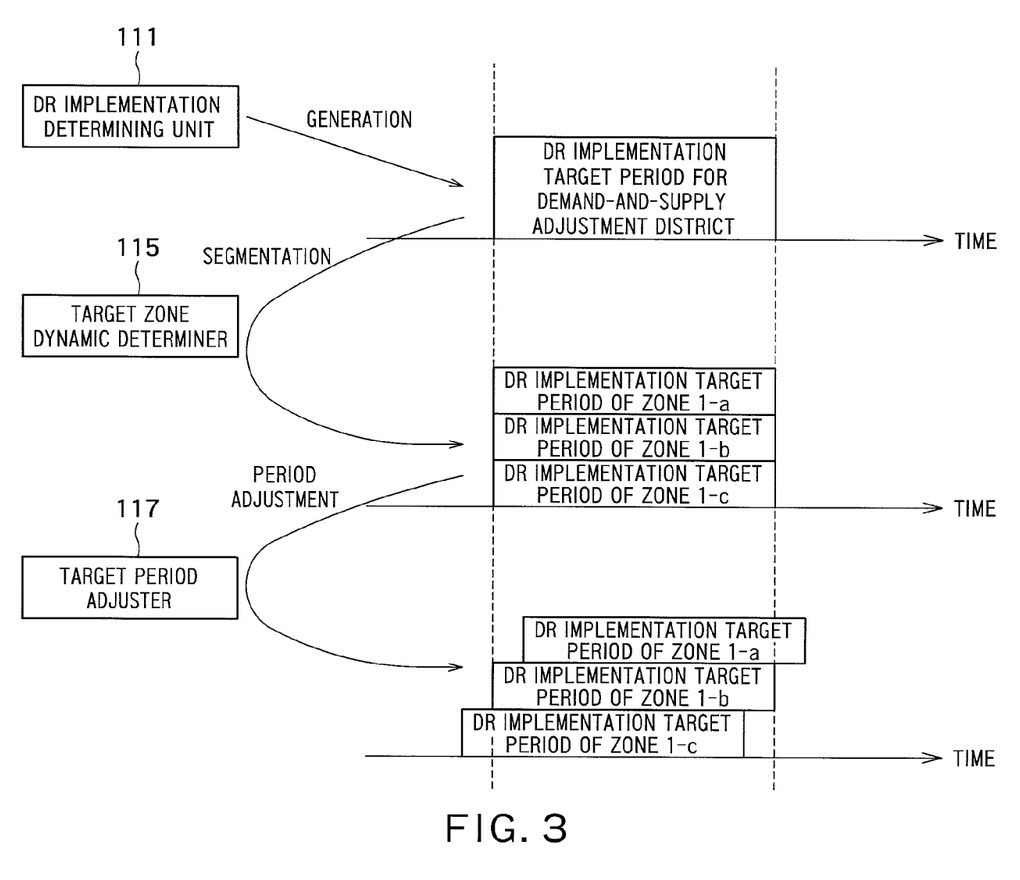
FIG. 3 illustrates a specific example of an operation in the first embodiment.

FIG. 3 illustrates a specific example of operations of the DR implementation determining unit 111, the target zone dynamic determiner 115 and the target period adjuster 117. The DR implementation determining unit 111 determines the DR implementation with respect to a demand-and-supply adjustment district 1 and generates the DR information. The Target zone dynamic determiner 115 segments the demand-and-supply adjustment district 1 into three DR implementation target zones (1-a, 1-b, 1-c) (see FIG. 1). Further, the target zone dynamic determiner 115 copies the DR information generated by the DR implementation determining unit 111, thus preparing the DR information of the respective DR implementation target zones. The Target period adjuster 117 performs such setting that the termination time of each of the DR implementation target zones (1-a, 1-b, 1-c) is shifted at an interval of a fixed period of time by shifting the DR implementation target period of the DR information forward and backward. Note that the DR implementation target period is shifted typically on a 15 min basis and a 30 min basis on the occasion of shifting this DR implementation target period. However, the shifting is not limited to this 15 min basis or 30 min basis. The termination time of the respective DR implementation target periods may also be set each other at an interval of a fixed period of time or longer. A magnitude of a difference of the DR implementation target period termination time between the zones 1-a and 1-b is to be the same as a magnitude of a difference of the DR implementation target period termination time between the zones 1-b and 1-c in the first embodiment. However, these magnitudes of the differences may also be different. Herein, lengths of the DR implementation target periods of the respective zones are the same. However, the embodiment is not limited to this setting.

A DR information transmitting unit 118 transmits the DR information of the respective zones to the EVs belonging to those zones. There are varieties of DR information expression methods and DR information transmission methods.

For example, the expression methods are exemplified by XML (Extensible Markup Language), JSON (JavaScript Object Notation) and CSV (Comma-Separated Values). Further, the transmission methods are exemplified by TCP/IP-based and UDP/IP-based HTTP (HyperText Transfer Protocol) and XMPP (Extensible Messaging and Presence Protocol). Furthermore, the transmission by an e-mail utilizing SMTP (Simple Mail Transfer Protocol) may also be available.

The target zone information added to the DR information is checked against the positional information of each EV in the EV information storage 114, whereby it is feasible to determine which DR information is to be transmitted and which EV is to receive.

The DR issuance system in FIG. 2 executes an EV information acquiring process and a DR issuance process by use of the respective units 111-118 described above The EV information acquiring process is periodically executed in accordance with the following procedures [1]-[3].

[1] The EV information acquiring unit 113 queries each EV about the information by performing the communication with the EV.

[2] Each EV sends back a location and a battery residual quantity of the EV itself.

[3] The EV information acquiring unit 113 records the acquired EV information in the EV information storage 114.

Figure 4:
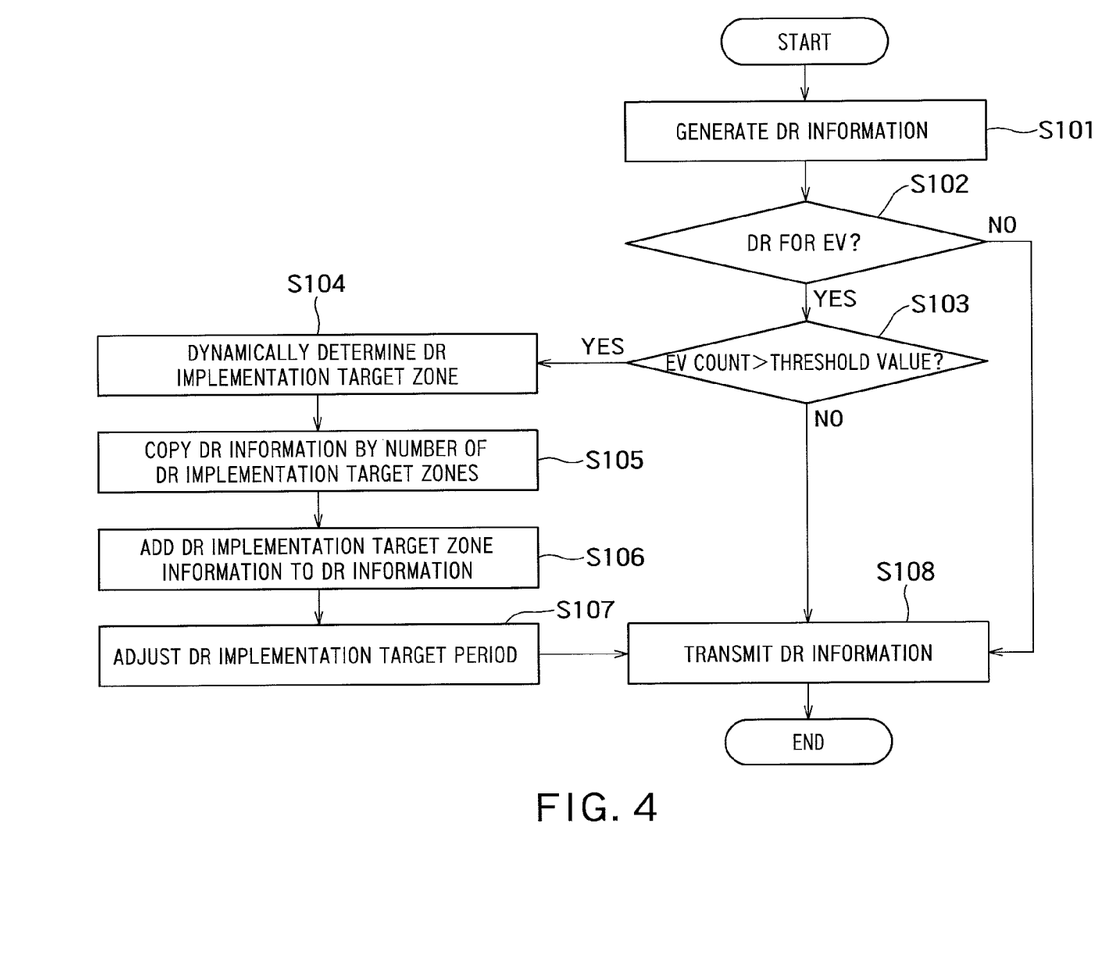
FIG. 4 shows a flowchart illustrating procedures of a DR issuance process.

FIG. 4 shows a flowchart illustrating procedures of the DR issuance process. However, the description will be made by exemplifying a case in which the target zone dynamic determiner 115 segments the demand-and-supply adjustment district on the basis of the "number of EVs". As described above, the segmentation may also be done on the basis of the "total value of the charge residual quantities of EVs" etc.

The DR implementation determining unit 111 determines the DR implementation and generates the DR information (S102).

A target consumption facility type in the DR information is determined (S102), and, if other than the EV (if being the fixed facility such as the building and the house), the DR information transmitting unit 118 transmits the DR information to the fixed facility (S108).

If the target consumption facility type in the DR information is the EV, the target zone dynamic determiner 115 determines whether or not the number of the EVs existing in the demand-and-supply adjustment district as the DR implementation target zone is larger than the threshold value (S103). If not larger than the threshold value, the DR information transmitting unit 118 transmits the DR information of the EVs (S108).

Whereas if the number of the EVs is larger than the threshold value, the target zone dynamic determiner 115 segments, based on the contents in the EV information storage 114, the demand-and-supply adjustment district into the plurality of DR implementation target zones. Namely, the target zone dynamic determiner 115 dynamically determines the plurality of DR implementation target zones. On this occasion, as described above, the demand-and-supply adjustment district is segmented so that the number of the EVs belonging to each of the zones after being segmented is equal to or smaller than the threshold value and is equalized as well (S104.)

The Target zone dynamic determiner 115 copies the DR information by the number of the DR implementation target zones (S105). It is to be noted that if the segmentation count is "1", the copy is not needed.

The target zone information adder 116 adds the information of each target zone to the DR information of each target zone (S106).

The target period is adjusted for every DR information, and a value of the "DR implementation target period" in the items of the DR information is updated (S107).

The DR information transmitting unit 118 transmits, to each EV, the DR information of the DR implementation target zone to which the EV belongs (S108).

The transmission is conducted for every DR implementation target zone before a fixed period of time of a start of each target period.

The DR information transmitted to the EV is transferred to the EV driver via a car navigation system and a smartphone. The EV driver may or may not stop charging according to the DR information.

In the case of stopping the charge before the target period, it can be deemed that the EV driver cooperates for the DR, which becomes an object to which the incentive is given. A higher incentive can be given as the stop gets sooner in the case of stopping the charge immediately after receiving the DR information. Information indicating that the charge is stopped is transferred to an EV management system through the EV information acquiring process by the EV information acquiring unit 113 of the DR issuance system. The EV information acquiring unit 113 updates the EV information in the EV information storage 114.

Thus, the DR issuance system according to the first embodiment enables an abrupt increase of the power consumption due to the charges of the EVs to be avoided immediately after the termination of the DR period with respect to the demand-and-supply adjustment district. This is attained by segmenting the EVs within the demand-and-supply adjustment district into the plurality of groups and setting the DR implementation target period so that the termination time is shifted by the fixed period of time on a group-by-group basis.

Second Embodiment

Figure 5:
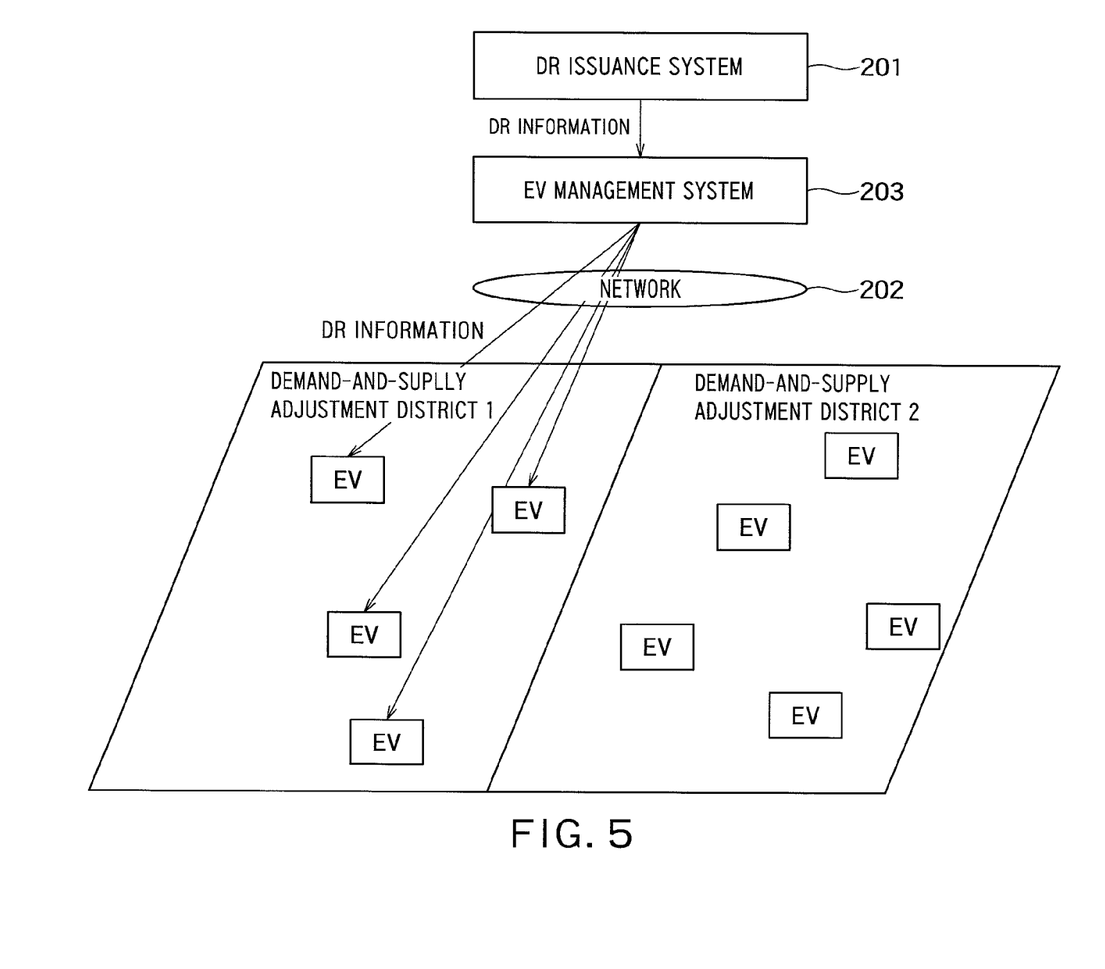
FIG. 5 illustrates the DR implementation environment assumed in a second embodiment.

FIG. 5 illustrates a DR implementation environment assumed in a second embodiment.

There exist a DR issuance system 201 defined as a system of the power supplier, an EV management system 203 to manage the EVs and the EVs.

The DR issuance system 201 is a system that issues the DR to the EV, the building, the house, etc in the demand-and-supply adjustment district. The EV management system 203 grasps the present positions and statuses of the EVs by performing the communications with the EVs. The EV management system 203 performs the communications with the EVs via a network 202. An arbitrary network type may be adopted. A general communication method utilizes a wireless communication line of the same telecommunications carrier as the telecommunications carrier to which a mobile phone or a smartphone belongs. However, the communication method is not limited to this method. The DR issuance system 201 transmits the issued DR information to the EVs via the EV management system 203.

Figure 6:
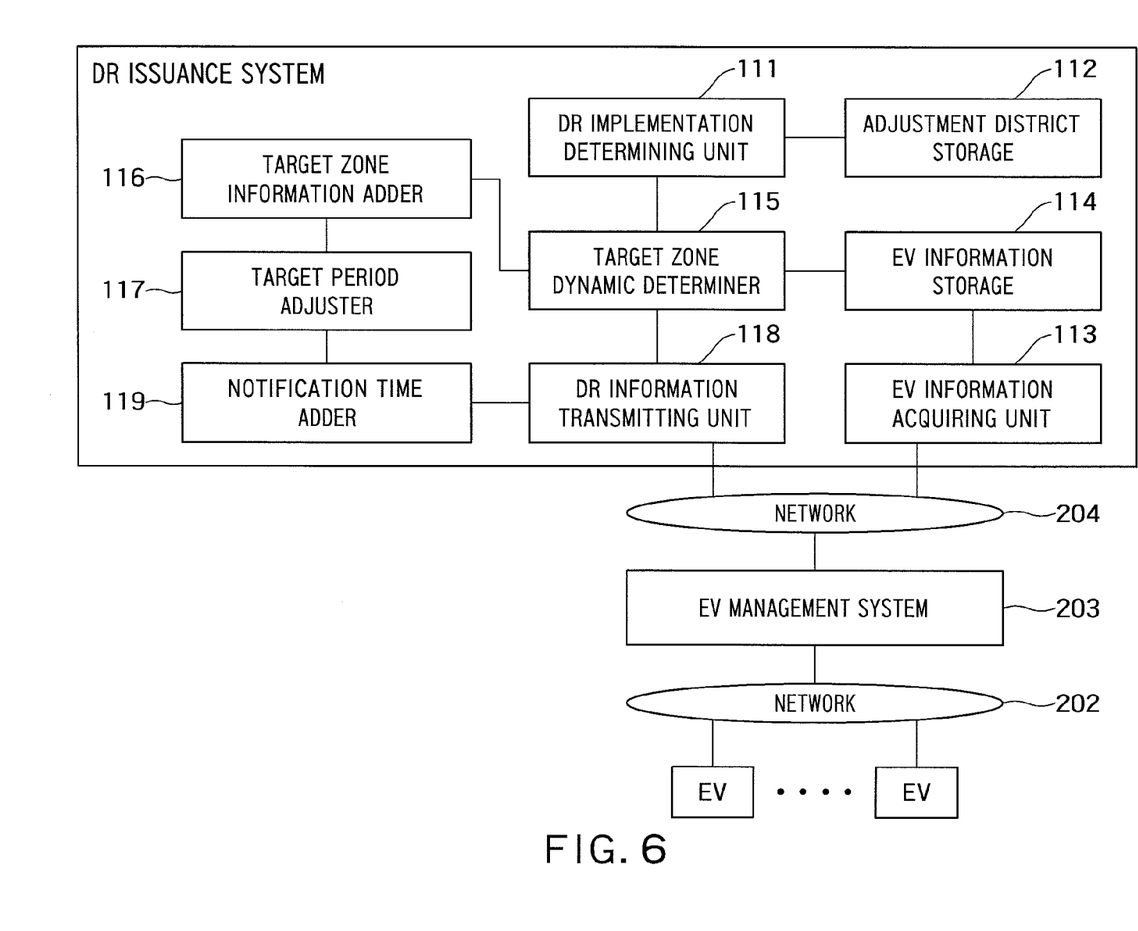
FIG. 6 illustrates a configuration of the DR issuance system according to the second embodiment.

FIG. 6 depicts a configuration of the DR issuance system 201.

A notification time adder 119 is added to the configuration of the first embodiment. Blocks of elements having the same nomenclatures as those in the first embodiment are marked with the same numerals and symbols, and their explanations are omitted except those of changed or extended processes.

The notification time adder 119 adds notification time to the DR information per DR implementation target zone in a way that corresponds to the start time of each DR implementation target period. This notification time is the time when the EV management system 203 notifies the DR information to the EV. The notification time ranges from, e.g., several minutes to several tens of minutes before the start time of the DR implementation target period that has already been adjusted by the target period adjuster 117. With this contrivance, the EV management system 203 under the control of another company controls the time when transferring the DR information to the EVs.

Several methods of expressing the notification time exist as given below. However, any methods may be adopted.
Absolute Time
Relative Time from Present Time
Relative Time from DR Implementation Target Period Herein, a reason why the notification time is added will be elucidated. If the notification time is not explicitly given, such a problem may arise that it cannot be assured when notified to the EVs. Such a case exists that an owner of the DR issuance system 201 is different from an owner (operating organization) of the EV management system 203, in which a power company owns the DR issuance system, while a car company owns the EV management system, and so on. If the owners of both systems are different from each other, the DR issuance system cannot assure when the DR information is notified to the EVs. However, from a standpoint of the DR issuance system, it is necessary to properly adjust the time when the DR information is notified to the EVs for the following reasons.

It is to be avoided to notify the DR information immediately before the DR implementation target period starts. A time for considering "whether to cooperate for the DR" is to be provided to the EV driver.

It is also to be avoided to notify the DR information far earlier before the DR implementation target period. This is because the operation of charging the EV with the electricity will have been done till the DR implementation target period starts. If so, it is easy to cooperate with the DR (not to charge during the DR implementation target period).

The DR issuance system in the second embodiment adds the notification time to the DR information in order to solve this problem.

The DR information transmitting unit 118 transmits the DR information, to which the notification time is added, to the EV management system 203 via a network 204. An arbitrary type of the network 204 may be adopted, and any inconvenience may not be caused by using a wired network or a wireless network.

The EV information acquiring unit 113 acquires the EV information from the EV management system 203. Contents of the information to be acquired are basically the same as those in the first embodiment. However, the information (IP address, port number, etc) for performing the communications with the EV may not be acquired. Instead, it is necessary to retain only the information for performing the communications with the EV management system 203.

The EV information storage 114 gets stored with the information acquired by the EV information acquiring unit 113.

The present DR issuance system executes the EV information acquiring process and the DR issuance process by using the respective units 111-119 described above.

The EV information acquiring process is periodically executed according to the following procedures [1]-[3].

[1] The EV information acquiring unit 113 queries the EV management system 203 about the information of the EVs.
[2] The EV management system 203 sends back the information of the EVs.
[3] The EV management system 203 records the acquired information of the EVs in the EV information storage 114.

Figure 7:
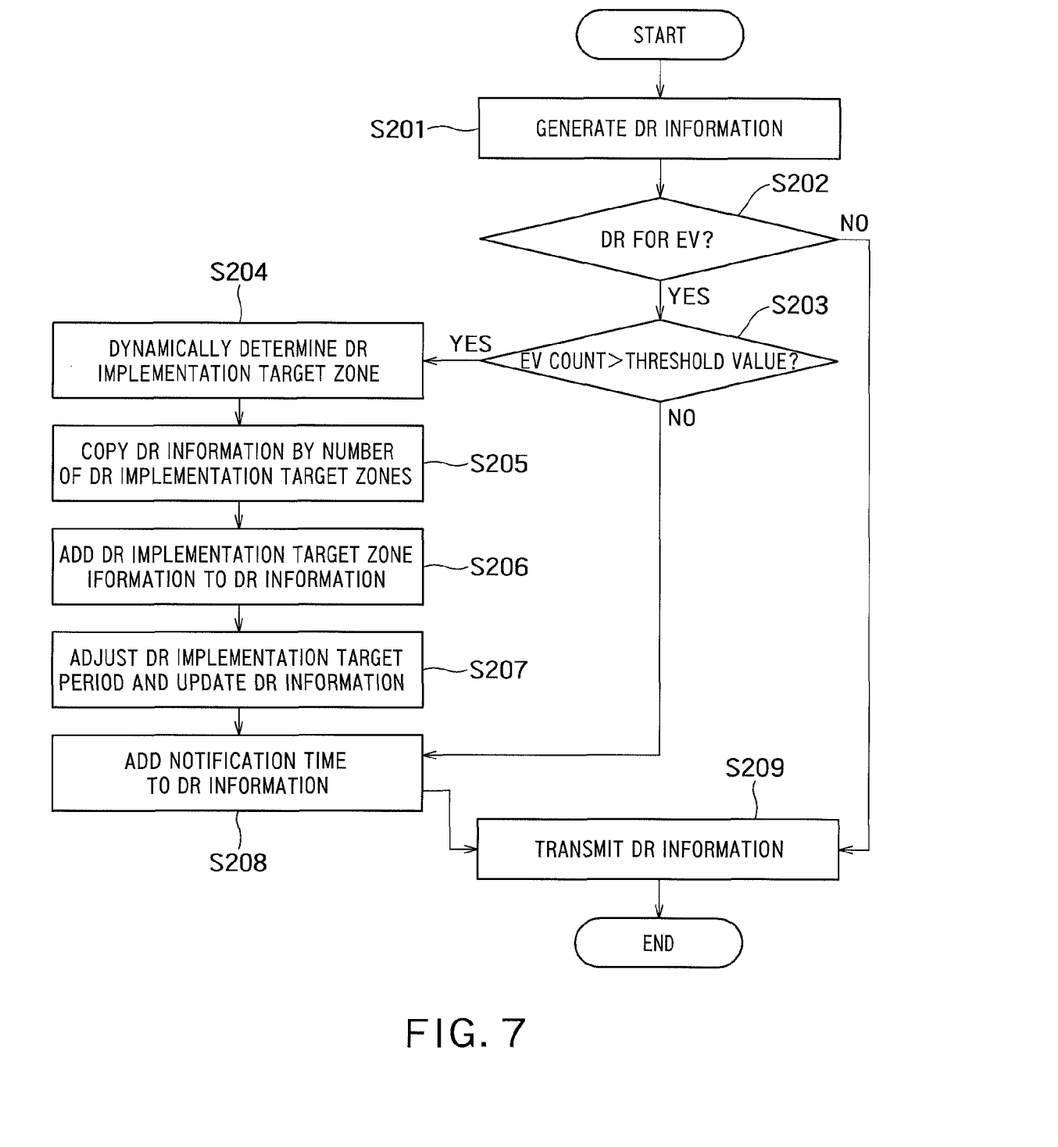
FIG. 7 shows procedures of the DR issuance process according to the second embodiment.

FIG. 7 shows a flowchart illustrating procedures of the DR issuance process.

The DR implementation determining unit 111 determines the DR implementation and generates the DR information (S201).

The target consumption facility type in the DR information is determined (S202), and, if other than the EV (if being the fixed facility such as the building and the house), the DR information transmitting unit 118 transmits the DR information to the fixed facility (S209).

If the target consumption facility type in the DR information is the EV, it is determined whether or not the number of the EVs existing in the demand-and-supply adjustment district as the DR implementation target zone is larger than the threshold value (S203). If not larger than the threshold value, the notification time adder 119 adds notification time to the DR information (S208), and the DR information transmitting unit 118 transmits the DR information to the EV management system 203 (S209).

Whereas if the number of the EVs is larger than the threshold value, the target zone dynamic determiner 115 segments, based on the contents in the EV information storage 114, the demand-and-supply adjustment district into the plurality of DR implementation target zones. Namely, the plurality of DR implementation target zones is dynamically determined within the demand-and-supply adjustment district (S204).

The Target zone dynamic determiner 115 copies the DR information by the number of the DR implementation target zones (S205). It is to be noted that if the segmentation count is "1", the copy is not needed.

The target zone information adder 116 adds the information of each target zone to the DR information of each DR implementation target zone (S206).

The target period is adjusted for every DR information, and a value of the "DR implementation target period" in the DR information is updated (S207).

The notification time adder 119 determines the notification time of the DR information in a way that corresponds to the target period in the DR information, and adds the notification time to the DR information (S208).

The DR information transmitting unit 118 transmits the DR information per DR implementation target zone to the EV management system 203 (S209).

The EV management system 203, when reaching the notification time added to the DR information, transmits the DR information to the EVs. At this time, the EVs becoming a transmission target is to be the EVs positioning in the target zone of the DR information at the notification time.

The DR information is transferred to the EV driver via the car navigation system and the smartphone. The EV driver may or may not stop charging according to the DR information.

In the case of stopping the charge before the target period, it can be deemed that the EV driver cooperates for the DR, which becomes the object to which the incentive is given. The higher incentive can be given as the stop gets sooner in the case of stopping the charge immediately after receiving the DR information. In the case of stopping the charge, the operation is notified to the DR issuance system via the EV management system 203. This becomes the object to which the incentive is given.

The DR issuance system according to the first or second embodiments may also be realized using a general-purpose computer device as basic hardware. That is, processing of each block in the system can be realized by causing a processor mounted in the above general-purpose computer device to execute a program. In this case, the system may be realized by installing the above described program in the computer device beforehand or may be realized by storing the program in a storage medium such as a CD-ROM or distributing the above described program over a network and installing this program in the computer device as appropriate. Furthermore, the storage in the system may also be realized using a memory device or hard disk incorporated in or externally added to the above described computer device or a storage medium such as CD-R, CD-RW, DVD-RAM, DVD-R as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information issuance system comprising:
processing circuitry configured to
acquire information on a plurality of electric vehicles via a network, and segment, based on the acquired information, the electric vehicles existing within a demand-and-supply adjustment district and travelling by use of electric power into first to N-th groups on the basis of a number of the electric vehicles;
set first to N-th target periods different from each other with respect to the first to N-th groups and generate first to N-th requests for requesting the electric vehicles to restrain electric charges from being performed during the first to N-th target periods; and
transmit, via the network, the first to N-th requests to the electric vehicles belonging to the first to N-th groups before starts of the first to N-th target periods.

2. The system according to claim 1, wherein the processing circuitry is configured to segment the electric vehicles so that a total demand quantity of the electric power of the electric vehicles is equalized between or among the groups.

3. The system according to claim 1, wherein the processing circuitry is configured to segment the electric vehicles so that the number of the electric vehicles is equalized between or among the groups.

4. The system according to claim 1, wherein the processing circuitry is configured to segment so that a total of residual quantities of the charges of the electric vehicles is equalized between or among the groups.

5. The system according to claim 1, wherein the processing circuitry is configured to segment a total of chargeable quantities of the electric vehicles so as to be equalized between or among the groups.

6. The system according to claim 1, wherein the first to N-th requests contain information specifying unit prices of the electric power applied for the first to N-th target periods, which are higher than a unit price of the electric power applied for a period except the first to N-th target periods, or information specifying an incentive fee for restraining the charge.

7. The system according to claim 1, wherein the processing circuitry is configured to segment the demand-and-supply adjustment district into first to N-th zones so that the electric vehicles respectively belonging to the first to N-th zones correspond to the electric vehicles belonging to the first to N-th groups.

8. The system according to claim 1, wherein the processing circuitry is configured to set the first to N-th target periods so that termination times of the first to N-th target periods are distanced from each other by a fixed period of time or longer.

9. The system according to claim 1, wherein lengths of the respective first to N-th target periods are the same.

10. The system according to claim 1, wherein the processing circuitry is configured to transmit a request for transmitting the first to N-th requests to the electric vehicles belonging to the first to N-th groups at a fixed time before a start time of each of the first to N-th target periods in place of transmitting the first to N-th requests, to an external management system that manages the electric vehicles.

11. An information issuance method comprising:
acquiring information on a plurality of electric vehicles via a network;
segmenting, based on the acquired information, the electric vehicles existing within a demand-and-supply adjustment district and travelling by use of electric power into first to N-th groups on the basis of a number of the electric vehicles;
setting first to N-th target periods different from each other with respect to the first to N-th groups and generating first to N-th requests for requesting the electric vehicles to restrain electric charges from being performed during the first to N-th target periods; and
transmitting, via the network, the first to N-th requests to the electric vehicles belonging to the first to N-th groups before starts of the first to N-th target periods.

12. A non-transitory computer readable medium having instructions stored therein which causes, when executed by a processor, to perform operations comprising:
acquiring information on a plurality of electric vehicles via a network;
segmenting, based on the acquired information, the electric vehicles existing within a demand-and-supply adjustment district and travelling by use of electric power into first to N-th groups on the basis of a number of the electric vehicles;
setting first to N-th target periods different from each other with respect to the first to N-th groups and generating first to N-th requests for requesting the electric vehicles to restrain electric charges from being performed during the first to N-th target periods; and
transmitting, via the network, the first to N-th requests to the electric vehicles belonging to the first to N-th groups before starts of the first to N-th target periods.

* * * * *